United States Patent [19]

Spangler

[11] Patent Number: 5,133,449
[45] Date of Patent: Jul. 28, 1992

[54] FRICTIONAL DRIVE SPIRAL CONVEYOR SYSTEM

[75] Inventor: Michael Spangler, Cambridge, Md.

[73] Assignee: The Cambridge Wire Cloth Company, Cambridge, Md.

[21] Appl. No.: 620,069

[22] Filed: Nov. 30, 1990

[51] Int. Cl.⁵ .................................................. B65G 21/18
[52] U.S. Cl. ...................................... 198/778; 198/832
[58] Field of Search ............................... 198/778, 832

[56] References Cited

U.S. PATENT DOCUMENTS

| | | | |
|---|---|---|---|
| 276,559 | 5/1883 | Campbell | 474/193 |
| 3,348,659 | 4/1967 | Roinestad | 198/778 |
| 4,036,352 | 7/1977 | White | 198/778 |
| 4,103,768 | 8/1978 | Persson | 198/778 |
| 4,367,596 | 1/1983 | Onodera | 34/147 |
| 4,448,301 | 5/1984 | Alger | 198/778 |
| 4,852,720 | 8/1989 | Roinestad | 198/778 |
| 4,875,343 | 10/1989 | Jeppsson | 62/381 |
| 4,901,844 | 2/1990 | Palmaer et al. | 198/778 |
| 4,924,998 | 5/1990 | Fuller, Jr. | 198/778 X |
| 4,941,566 | 7/1990 | Irwin | 198/778 |
| 4,981,208 | 1/1991 | Jones | 198/778 |

Primary Examiner—Robert P. Olszewski
Assistant Examiner—James R. Bidwell
Attorney, Agent, or Firm—Cushman, Darby & Cushman

[57] ABSTRACT

A spiral conveyor system utilizing an endless flat belt is disclosed. The belt travels in an endless path which includes a spiral portion. The belt is primarily driven in the spiral portion by a frictional engagement between the belt and a rotating driving element. The frictional engagement is enhanced by attaching friction increasing elements to the belt and driving element.

50 Claims, 14 Drawing Sheets

FRICTIONAL DRIVE SPIRAL CONVEYOR SYSTEM

FIELD OF THE INVENTION

This invention relates to endless conveyor belt systems and in particular to endless conveyor belt systems driven in a spiral path.

BACKGROUND OF THE INVENTION systems in which conveyor belts are driven in a spiral path with the belt curving edgewise around a series of vertically spaced loops are commonly used to provide a great length of endless conveyor belt in a relatively small space. A particular advantage of such systems is that they can be used with high production volume operations while at the same time providing the long process dwell time required for certain processes, such as product warming or freezing.

One conveyor system of this type is disclosed in U.S. Pat. No. 4,741,430. This system uses a positive drive to propel the belt. The drive includes a cylindrical cage rotatable about a vertical axis and having a plurality of vertical driving bars spaced circumferentially around the cage. The bars have radial driving surfaces arranged in overlapping and abutting relationship with protrusions which are spaced along the radially inner edge of the belt in the spiral loops so as to positively drive the belt. Tension is maintained in the outside edge of the belt to hold the belt against the driving bars so that the driving action is accomplished. This tension is significantly lower than the tension the belt would experience in a straight line conveyor.

Positive drive spiral belt systems suffer certain drawbacks. It is difficult to match the speed of the multiple mechanical drives in the system. Engagement of the driving surface with the belt surface is difficult to initiate and maintain smoothly. The pitch of the belt changes as the belt enters and leaves the series of spiral loops. This changing pitch can not be compensated for by the drive mechanism. Thus, as belt pitch increases, driving contact is lost allowing the belt to become slack and migrate backward. A decrease in belt pitch causes the belt tension to increase resulting in belt surging, increased wear, fatigue failure and other damage to the system. Accordingly, although such a positive drive system offers the potential for very low conveyor belt tension, as a practical matter, a state of continuous, smooth, low tension operation is very difficult to achieve and maintain.

Another conveyor system of this type is disclosed in U.S. Pat. No. 3,348,659. In this system, the belt is not positively driven but frictionally driven. Tension is induced in the spiral belt so that there is frictional contact between the radially inner edge of the belt and a plurality of driving elements attached to a drive drum. This belt system is then frictionally driven by the driving elements which slidingly engage the radially inner edge of the spiral belt loops. The driving elements move faster than the belt and continuously slide past the belt edge to achieve a frictional drive.

This friction drive, while still achieving moderately low belt tensions, greatly reduces the need for, and problems associated with multiple drive speed matching. In such systems tension must be induced in the outer belt edge, thereby constricting the belt around the drive drum. This results in a contact force, $F_N$, between the inside belt edge and the driving elements. This contact force times the coefficient of friction between the belt and driving elements results in the belt driving force.

This belt driving force must overcome the live load frictional force which is the belt, plus product weight times the coefficient of friction between the belt and belt support elements. Therefore, it can be shown that the required belt tension, T, is directly proportional to the belt to belt support friction $f_s$ or $$T \alpha f_s$$

and is inversely proportional to the belt to belt drive element friction $f_D$ or $$T \alpha 1/f_D$$

or combined $$T \alpha f_s/f_D$$

Since conveyor belt life is a function of belt tension, it is desirable to achieve the lowest possible belt tension. As normally practiced, the belt drive elements and belt support elements are capped with a polyethylene, or ultra high molecular weight polyethylene face which acts as a wear surface between the metal or plastic conveyor belt and the metal conveyor elements.

In an effort to reduce belt tension by lowering $f_s$, lubricated belt support plastic capping has been used. However, this has been known to contaminate the product the belt is transporting and over a period of time, combines with product fines to form an abrasive paste which actually increases $f_s$.

Other various attempts have been made to increase $f_D$ by placing vertical ridges or grooves in the drive element capping which engage projections in the edge of the belt. While sometimes reducing belt tension, such measures normally result in undesirable belt vibration and product orientation problems. To reduce the belt vibration, the speed of the drive drum is lowered so that the relative speed between the drum and inside belt edge are more closely matched. This, however, results in a lowering of the drive force. As a result, belt tension must be increased, thus counteracting the initial benefits of the grooved wearstrips.

SUMMARY OF THE INVENTION

In a frictionally driven spiral cage conveyor system, belt tension can be reduced by increasing the tractive force between the inside belt edge and the conveyor drive elements. This is optimally accomplished through matching of materials at the contact interface to effect an increase in the coefficient of friction at the interface without resorting to the use of relatively large projections or grooves at the interface between the belt and conveyor drive element. In this manner, low belt tension can be established and maintained while achieving a smooth belt motion.

One method in which this is accomplished is through the use of special polymeric materials for the drive element capping, and belt edge should the belt be made of plastic, which offer good wear resistance and a coefficient of friction in which $f_D$ is 1.3 to 2.3 times $f_s$.

It can be shown that this coefficient of friction $f_D = 1.3$ to 2.3 times $f_s$ is in the optimum range since lower $f_D$ results in action similar to that with conventional materials and higher $f_D$ results in belt "sticking", vibration, and surging, similar to positive or semi-positive drive systems.

One method in which this can be accomplished is through the use of matched materials on the inside belt edge and drive element capping to achieve a coefficient of friction $f_D$ in the range of 1.3-2.3 $f_s$.

For applications using a metal conveyor belt, the drive element can be capped with a durable friction surface such as a hard rubber or brake lining type material.

For applications utilizing a plastic conveyor belt, the inside belt edge and drive element capping can be made from polymeric materials designed to achieve the 1.3-2.3 friction factor proportion. Since the choice of material for plastic conveyor belts is limited due to economic reasons, and the belt edge is a critical portion of the belt, the matching of a belt edge material to drive element capping material can best be accomplished by insert molding the selected material on the belt edge.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

DETAILED DESCRIPTION

Figure 1:
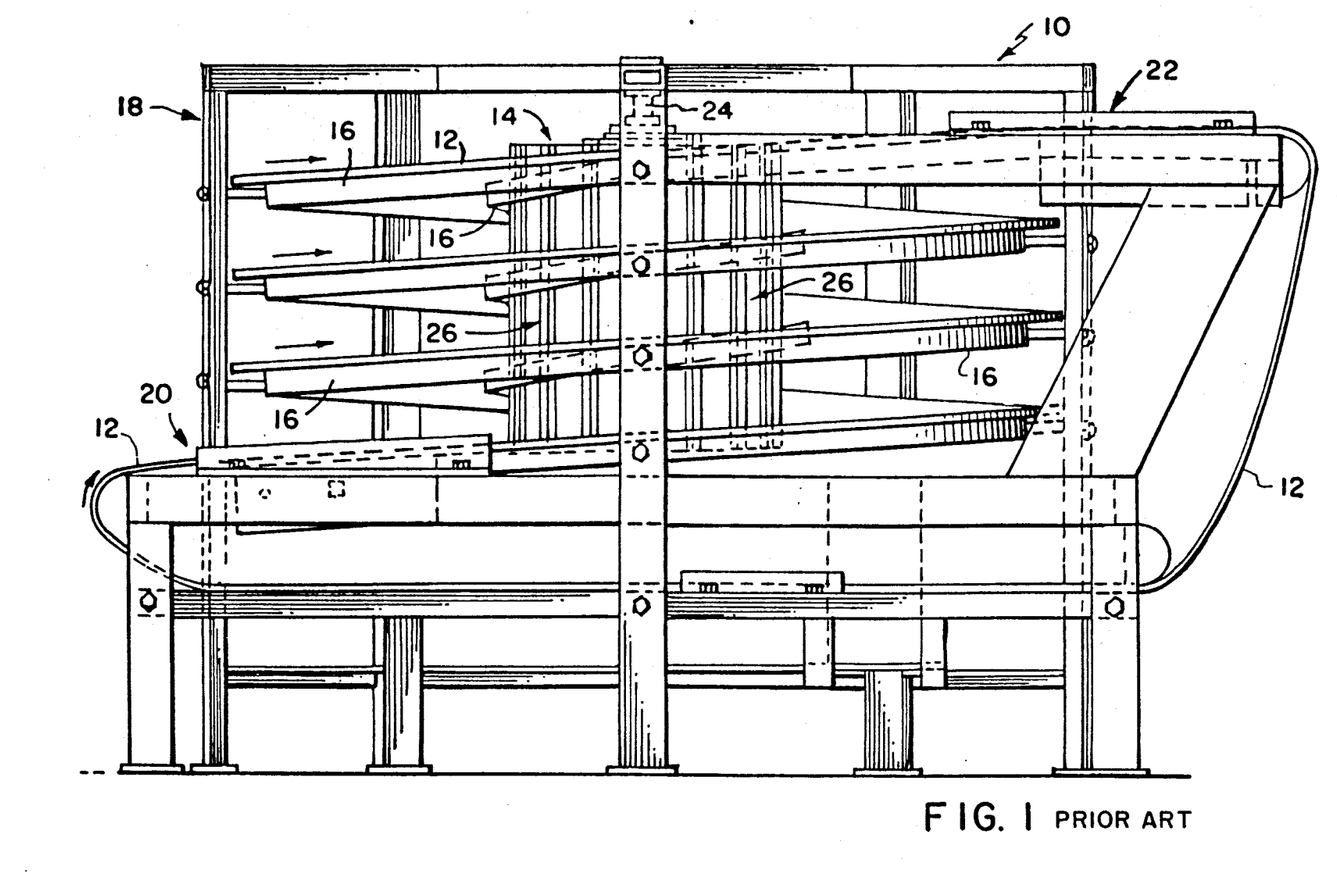
FIG. 1 (Prior Art) is a side view of a spiral conveyor system.
Figure 2:
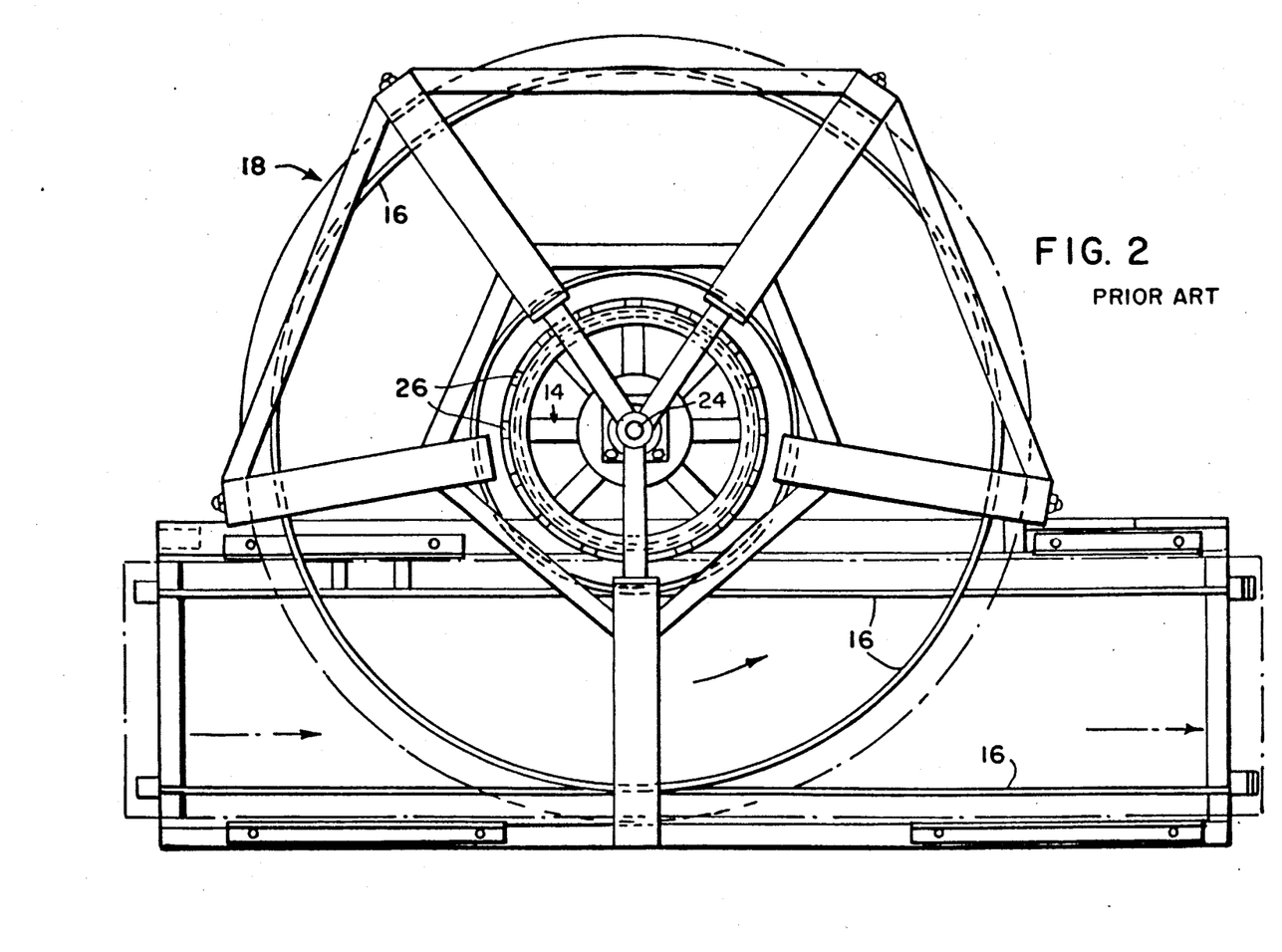
FIG. 2 (Prior Art) is a top plan view thereof.

FIGS. 1 (Prior Art) and 2 (Prior Art) illustrate side and top views, respectively, of a spiral conveyor system 10 utilizing an endless conveyor belt 12. The belt is made of modular links connected together and adapted to collapse along one edge of the belt and expand along the opposite edge to permit passage of the belt around lateral curves. The belt 12 travels in an endless path which includes a spiral portion. In the spiral portion, the belt 12 is wound about a driving cage 14 in a vertically oriented helix. The belt 12 is supported in a spiral track 16 which also winds around the driving cage 14. The driving cage 14 and spiral track 16 are supported by a frame 18. Although only three loops are shown in FIG. 1 (Prior Art), as forming the helix, it should be understood that a conveyor system could be built with a different number of loops. The belt 12 enters the spiral portion at 20 and exits the spiral portion at 22, arrows indicating the direction of travel of the belt 12.

The driving cage 14 rotates about a shaft 24 and is driven by conventional means which are not shown. The driving cage 14 has a plurality of vertically oriented driving elements 26 spaced circumferentially around the cage 14. In a preferred embodiment, the driving elements 26 are made of steel. A conventional secondary drive, not shown, pulls the belt 12 from the spiral portion of cage 14. The secondary drive includes a tension in the spiral belt such that there is frictional contact between the radially inner edge of the belt 12 and the driving cage 14. The driving cage 14 moves faster than the belt 12 whereby it continuously slides past the edge of the belt 12 to achieve a frictional drive. After being pulled from the spiral portion, the belt 12 loops back to the entrance of the spiral portion by the cage drive.

Figure 3:
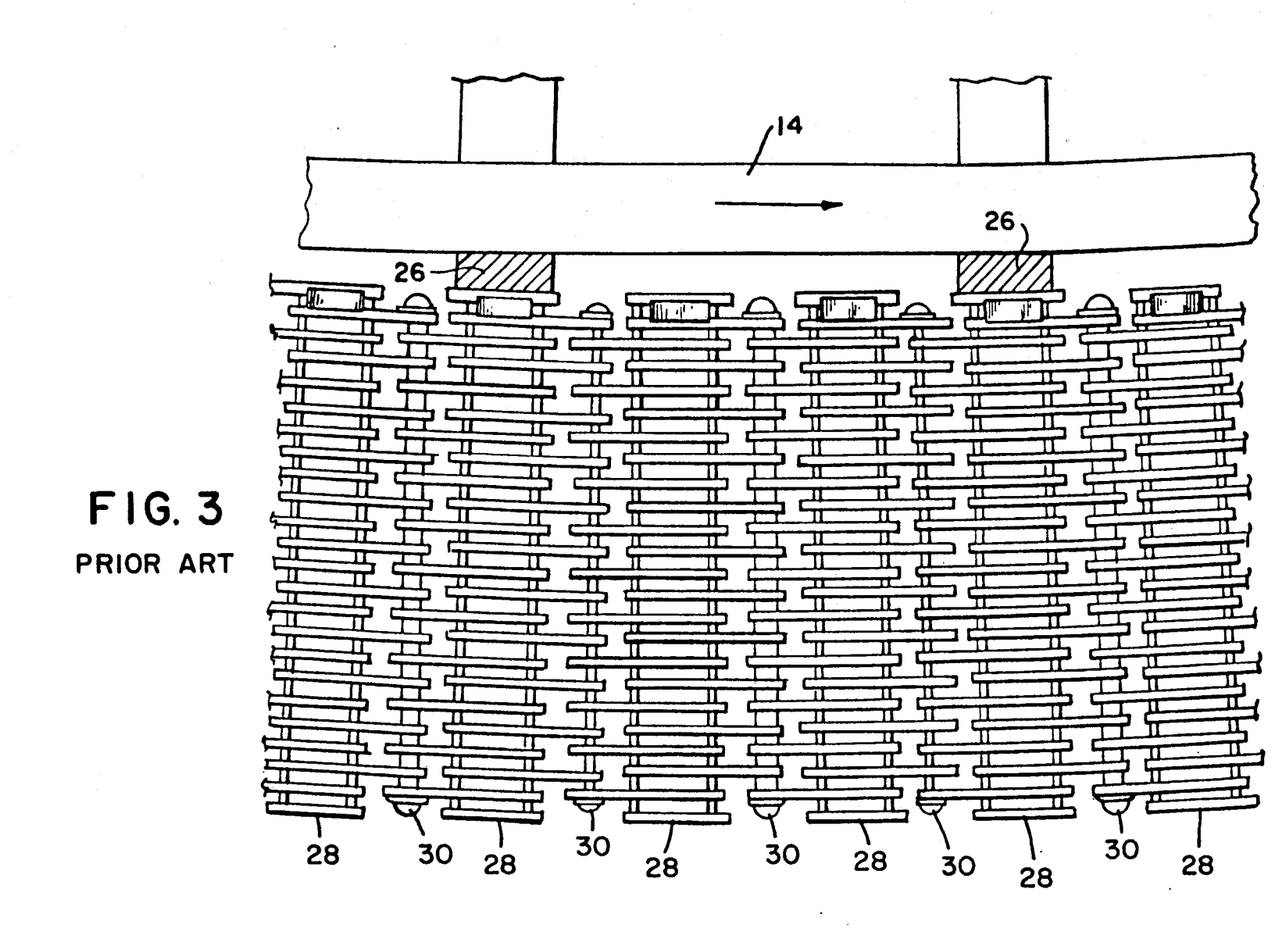
FIG. 3 (Prior Art) is a top plan view of a portion of a spiral conveyor system in operative relationship with a modular plastic drive belt.

FIG. 3 (Prior Art) shows a belt 12 arranged in operative relationship with the driving elements 26. The belt 12, described further in U.S. Pat. No. 4,557,374, comprises a plurality of individual plastic modules 28 joined by hinge rods 30.

Figure 4:
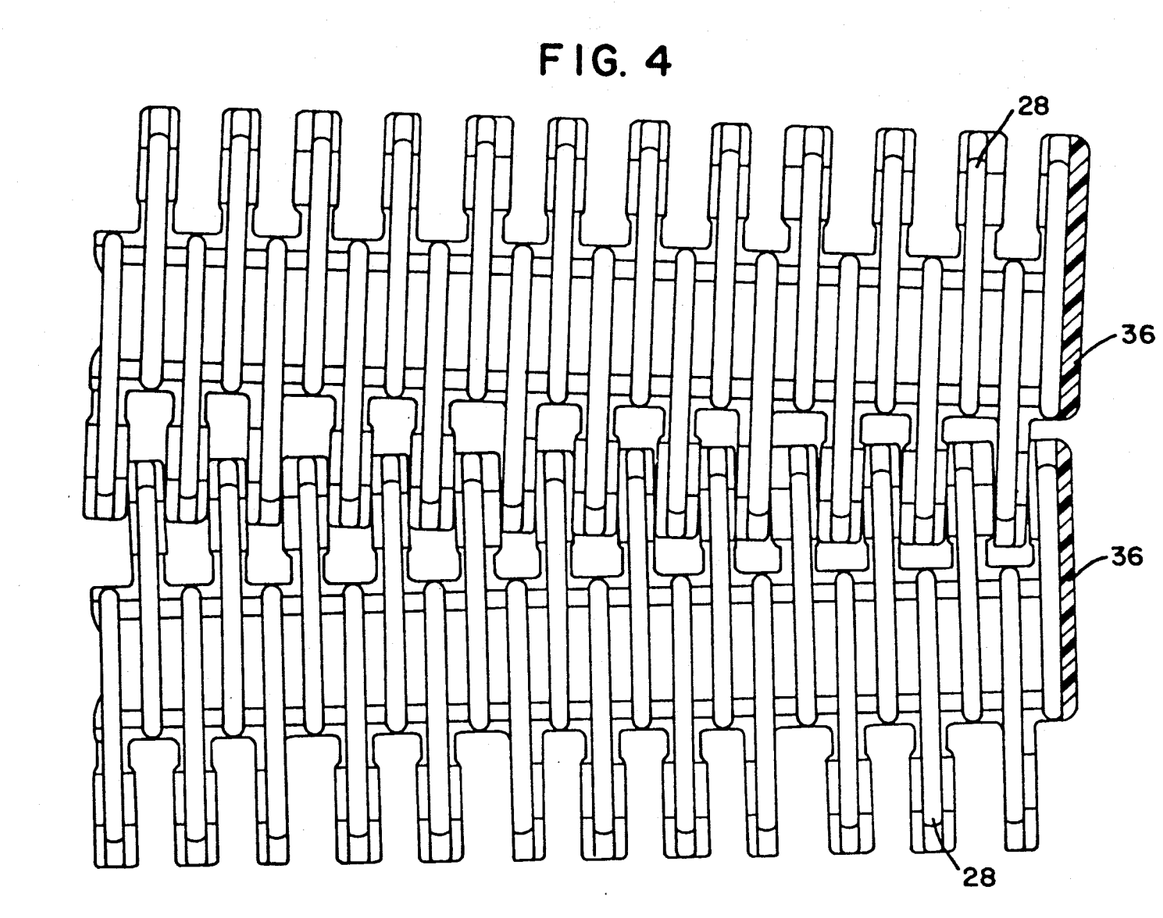
FIG. 4 is a top plan view of a pair of belt modules having matched friction inserts molded thereon.

In FIG. 4, it can be seen how a friction insert 36 can be attached to the inside edge of each belt module 28. The friction insert 36 can be constructed from any material. Preferably, this will be a material which will achieve the 1.3-2.3 friction factor proportion when matched with a drive element capping. In one embodiment, a polymeric material such as polyurethane is used, which has good friction and wear properties, but low strength and stiffness. Since the friction insert 36 is only attached to the inside edge of each belt module, 28, high strength and stiffness are not required as this is provided by the belt module 28. In a preferred embodiment, the friction insert 36 is insert molded to the edge of the belt module 28. However, the friction insert 36 can be attached by snap-fitting or use of fasteners, clamps, adhesive or any other suitable means.

Figure 5:
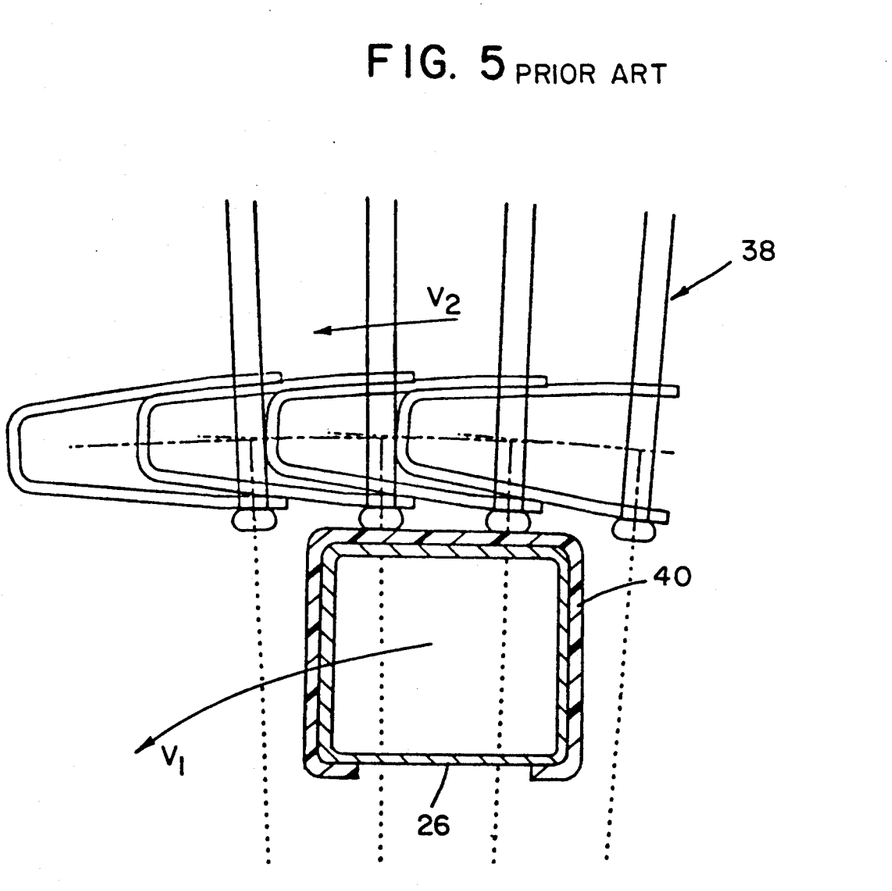
FIG. 5 (Prior Art) is a sectional view of a conventional metal conveyor belt inside edge in contact with a hard plastic capping of a conventional drive element.

FIG. 5 (Prior Art) shows a conventional metal belt 38 with its inside edge in contact with a hard plastic capping 40 attached to a driving element 26. The frictional driving force is provided by this contact. $V_1$ and $V_2$ represent velocities of the driving element 26 and belt 38, respectively.

Figure 6:
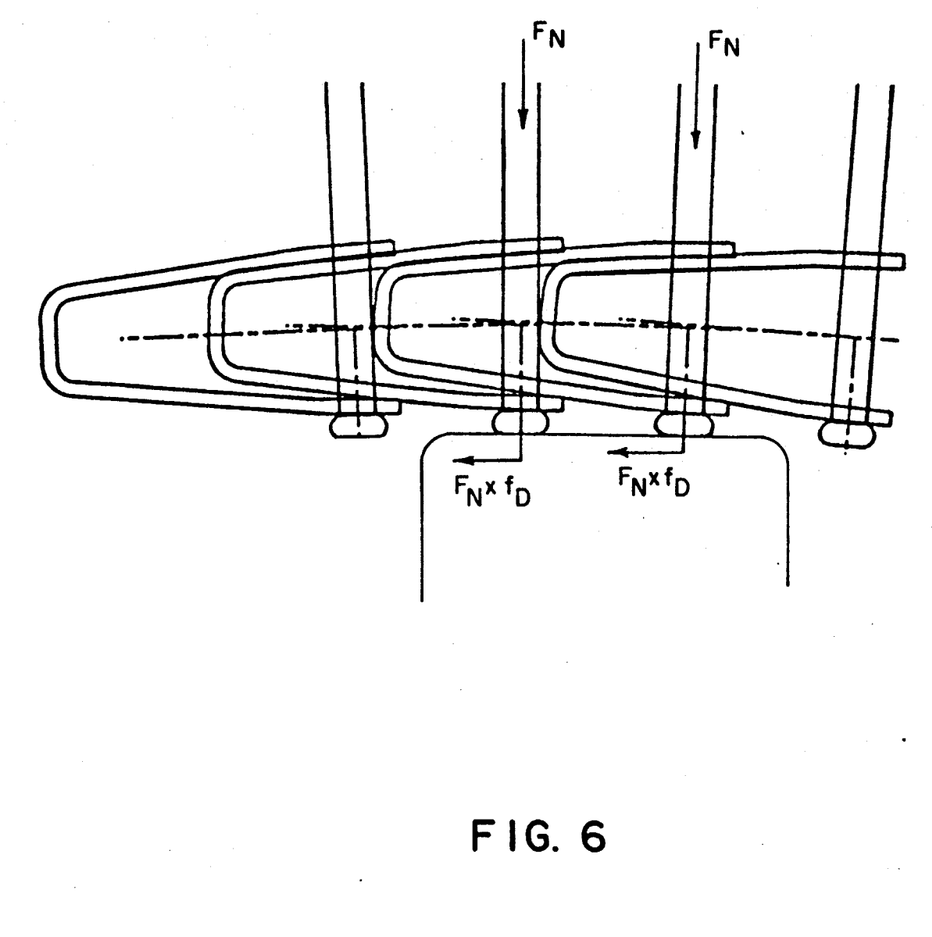
FIG. 6 (Prior Art) is a sectional view of a conventional metal conveyor belt showing the drive forces.

FIG. 6 (Prior Art) shows an enlarged schematic view of the edge of belt 38 and driving element 26. The frictional driving force results from the friction coefficient $f_D$ times the normal force $F_N$.

As previously mentioned, the drive elements on spiral cage conveyor systems are normally covered with a plastic capping (polyethylene, ultra-high molecular weight polyethylene, nylon) which acts as a wear surface between the metal drive elements and the radially inner belt edge. The capping is monolithic in construction consisting of a uniform structure. The material is normally chosen for its strength, durability, and excellent wear resistance. In order to increase the belt to drive element friction and reduce belt tension one can use a material with a higher coefficient of friction $f_D$. However, doing so sometimes results in the selection of a material with lower strength or wear resistance, significantly reducing the service life of the capping. This, in turn, is undesirable since the capping must be replaced more often, increasing system down time and maintenance costs.

By using a combination of at least two different materials for one or both of the drive element capping and radially inner belt edge, one can achieve combinations of friction coefficients $f_D$ and contact surface wear resistance which are not possible with a single material. Accordingly, one can tailor $f_D$ and the resulting drive force for each particular application.

Figure 7:
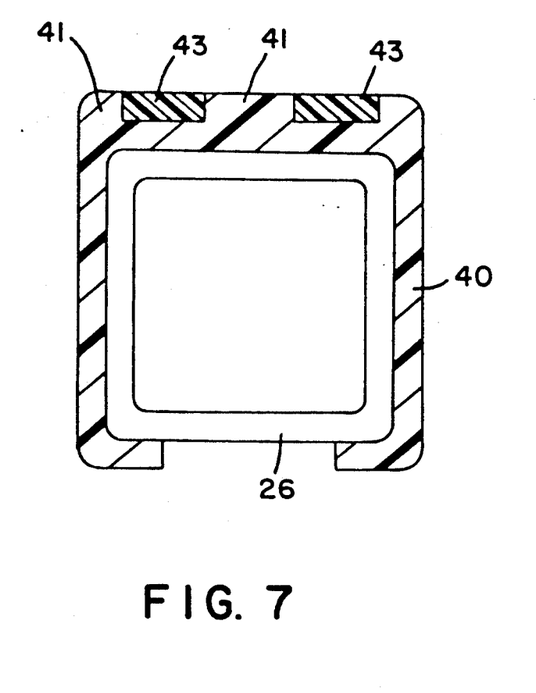
FIG. 7 is a sectional view of a alternative embodiment of a drive bar capping.

One method in which this is accomplished is shown in FIG. 7. In this embodiment, the capping 40 is constructed from more than one material. The primary material 41 provides for the basic structure of the capping and long term wear resistance. A secondary material 43 provides a higher friction for improved drive force. A combination such as UHMWP and polyurethane would achieve the desired wear resistance, strength and friction, although many other combinations are possible. The secondary material 43 may be bonded to the primary material 41 by co-extrusion, adhesives, key slots or dove-tailing, mechanical fasteners, press fitting or other methods. In an alternative embodiment, the primary material 41 provides a higher friction component while the secondary material 43 provides wear resistance.

Figure 8:
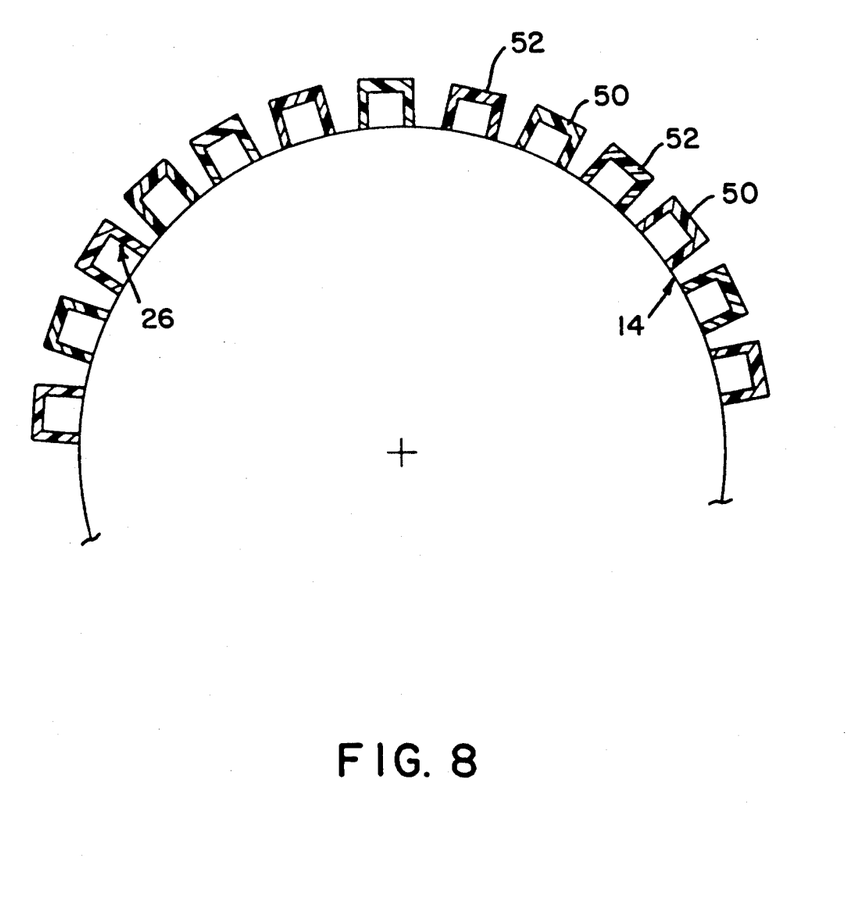
FIG. 8 is a partial sectional view of an alternative embodiment drive element.

Another embodiment is shown in FIG. 8. In this embodiment, there are at least two different sets of drive element caps 50 and 52 constructed from different materials, assembled in an alternating pattern to provide both wear resistance and high friction. Different patterns of alternating the different material caps around the drive cage may be used to achieve the desired degree of wear resistance and friction.

Figure 9:
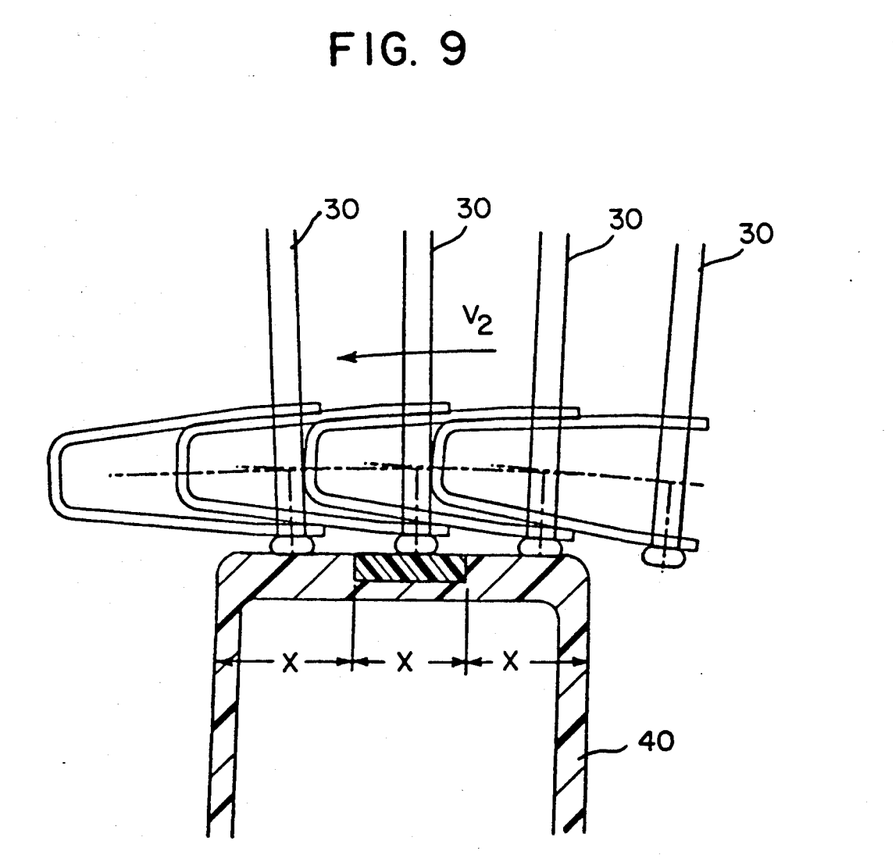
FIG. 9 is a sectional view of a conveyor belt contacting an alternative embodiment of a drive bar capping.

A further definition of the embodiment shown in FIG. 7 is shown in FIG. 9. In this embodiment, there is a critical spacing "X" between the wear resistant material and the friction material. The critical spacing "X" is configured so that the heads of adjacent hinge rods 30 are in simultaneous contact with both materials, thereby distributing the pressure evenly over both materials and resulting in smoother belt action and increased drive element capping service life.

Figure 10:
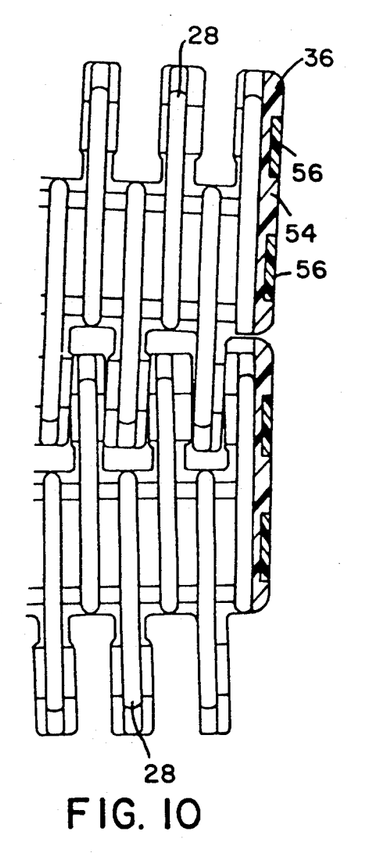
FIG. 10 is a partial top plan view of an alternative embodiment belt module.
Figure 11:
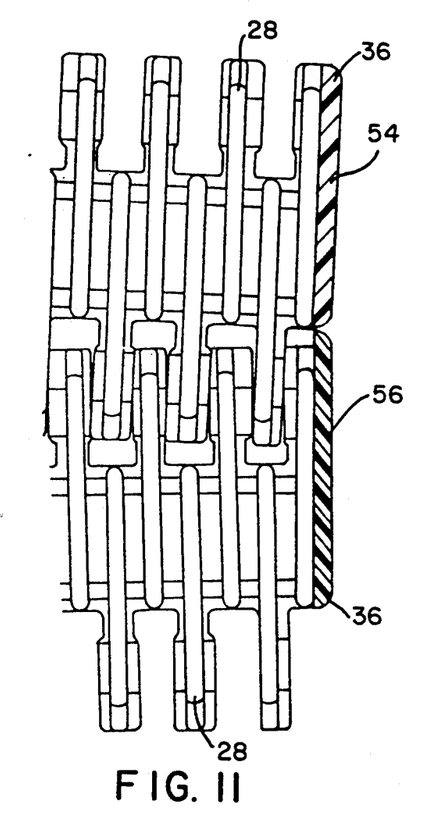
FIG. 11 is a partial top plan of an alternative embodiment belt module.

Another embodiment is shown in FIG. 10 where the friction insert 36 contains alternating materials 54 and 56. The alternating materials can either be contained on or alternating pitches as shown in FIG. 10, or on alternating pitches as shown in FIG. 11.

Figure 12:
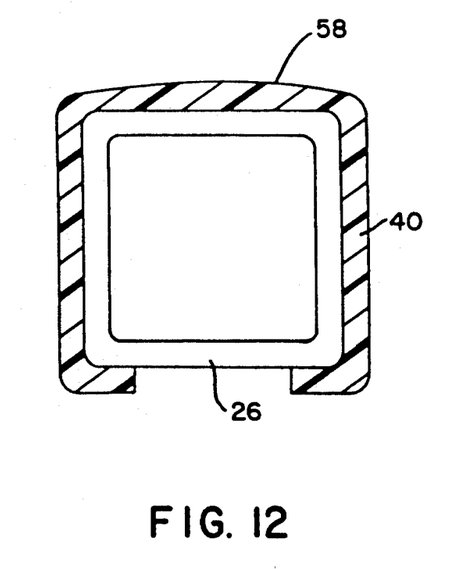
FIG. 12 is a sectional view of an alternative embodiment of a drive bar capping.

Another embodiment is shown in FIG. 12, where the drive element cap 40 is crowned on its belt edge contact surface 58. The radium of this crown is selected to approximate that of the inner belt edge, although a different radium may be advantageous in selected applications. The crown on the drive element cap 40 results in a more uniform contact pressure between itself and the inner belt edge. This increases the utilization efficiency of the friction and wear properties of the cap materials. It also reduces the possibility of the projections on the belt edge catching and "hanging up" on the leading edge of the cap, thereby providing smoother belt function.

Figure 13:
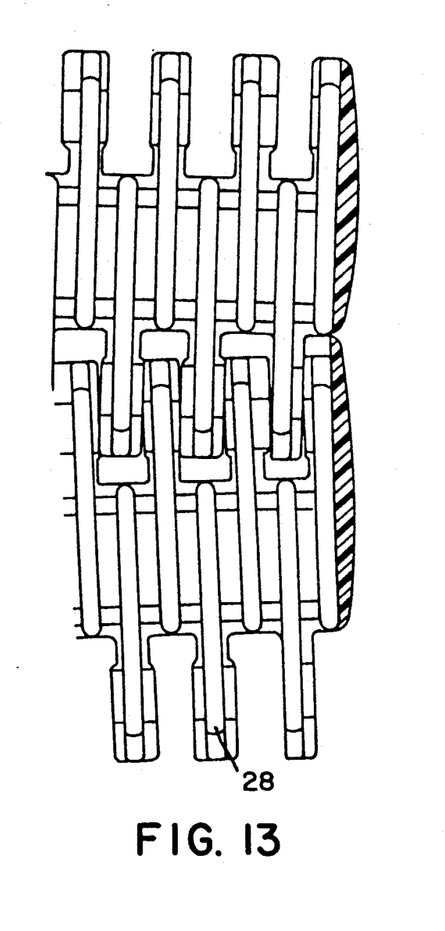
FIG. 13 is a partial top plan view of an alternative embodiment belt module.
Figure 14:
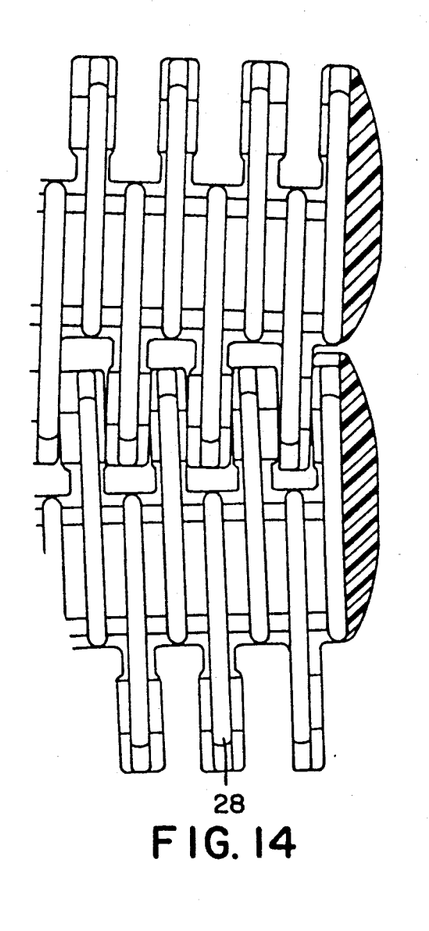
FIG. 14 is a partial top plan view of an alternative embodiment belt module.

Correspondingly, as shown in FIG. 13, the radially inner edges of the modules 28 are crowned to provide a transition surface with a broad contact area. This surface may be either fully crowned or a truncated crown as shown in FIG. 14 to provide increased surface contact area.

Figure 15:
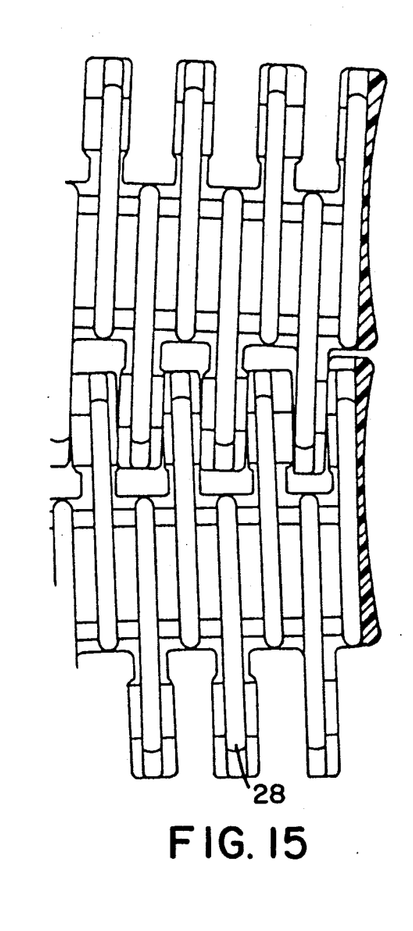
FIG. 15 is a partial top plan view of an alternative embodiment belt module.

A further embodiment is shown in FIG. 15 where the inner edges of the modules 28 are concave. This is advantageous for conveyor systems in which the drive elements are narrow strips, or for systems where the drive element includes a continuous drum. The radius of the concave arc matches that of the drive element, increasing surface contact and drive force.

Figures 16, 17:
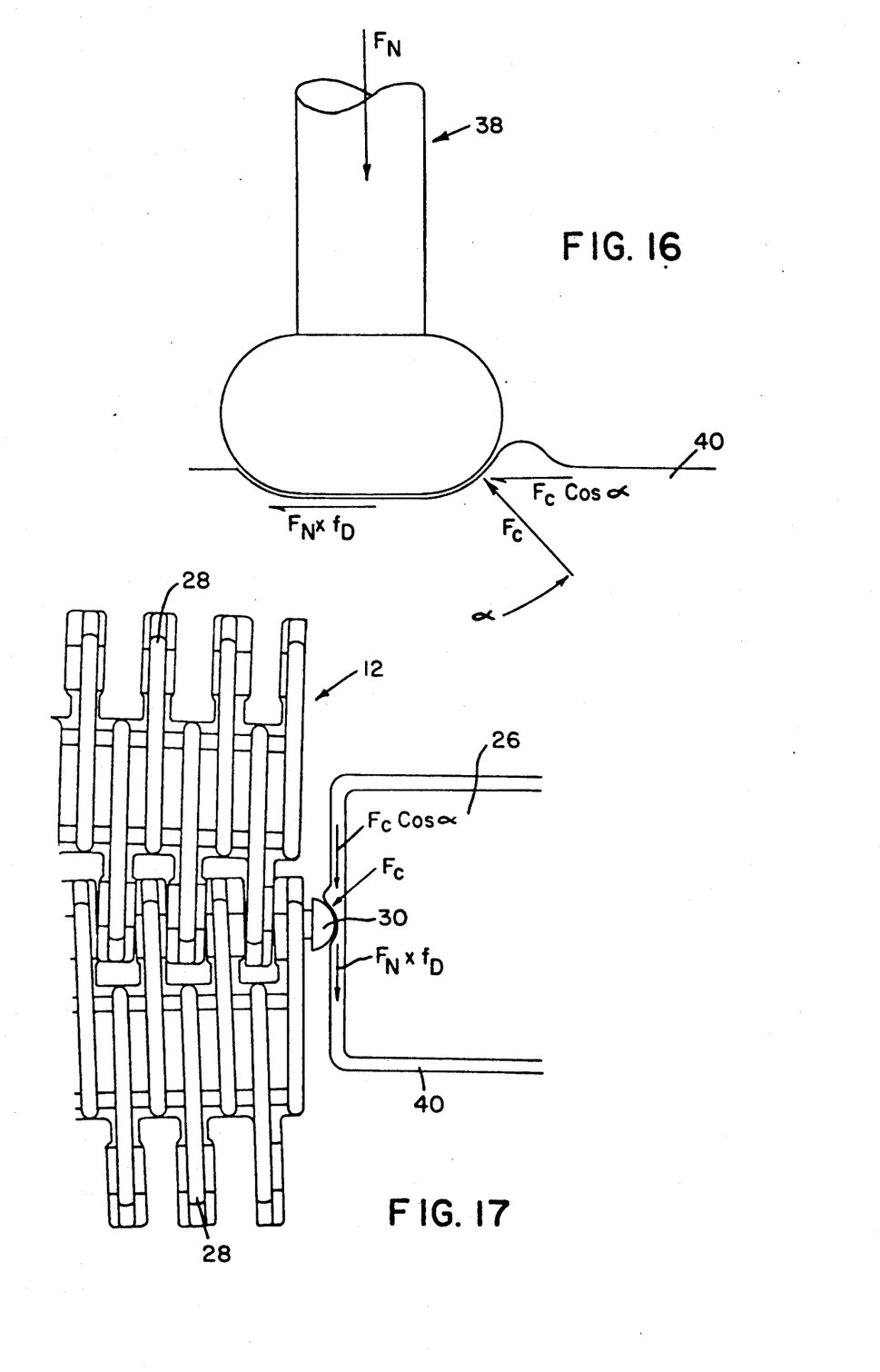
FIG. 16 is a sectional view of an embodiment where a conventional metal conveyor belt engages a compliant capping on the drive bar.
FIG. 17 is a sectional view of a plastic belt engaging the compliant capping.

FIG. 16 shows another embodiment of the present invention which uses a compliant material such as polyurethane or some similar elastomeric material for the drive element capping 40. Projections on the inside edges of the belt 38, under pressure, slightly embed themselves into the capping 40, creating an additional force vector in the direction of the drive force. This results in an apparent increase in the coefficient of friction between the belt edge and drive bar element without the vibration or belt movement caused by projections and grooves in relatively hard materials. The drive force is now a summation of $f_D$ times $F_N$ plus $F_C \cos \alpha$ where $F_C$ is the force vector resulting from the pressure of the side of the rod against the compliant material and $\alpha$ is the angle between $F_C$ and $F_N \times f_D$. Since the resulting drive force is greater with the compliant material capping 40, $F_N$ can be reduced, thereby resulting in lower belt tension while maintaining the same drive force.

FIG. 17 shows how a plastic belt 12 comprising modules 28 and hinge rod 30 can be used with a compliant capping 40. The head of hinge rod 30 slightly embeds itself in the compliant capping 40. The force equations are the same as discussed above with reference to FIG. 16.

Figure 18:
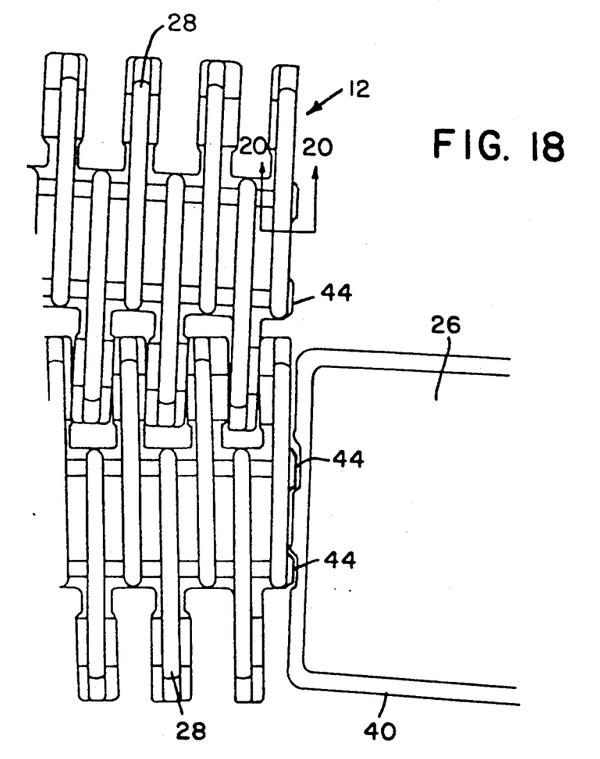
FIG. 18 is a sectional view of an alternative embodiment plastic belt module engaging the compliant capping.
Figure 19:
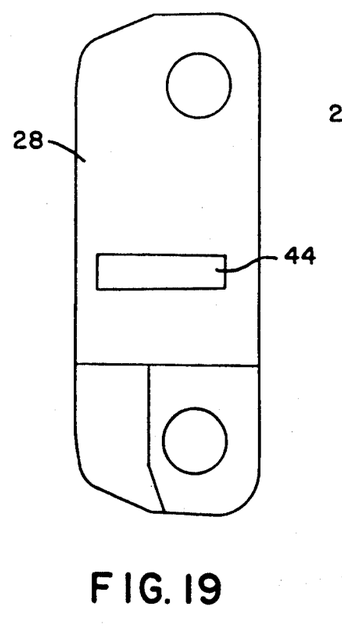
FIG. 19 is a side view of the plastic belt module engaging projection shown in FIG. 18.
Figure 20:
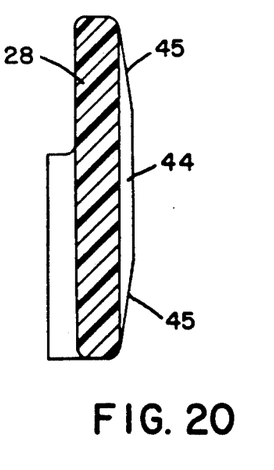
FIG. 20 is a sectional view along lines 20—20 in FIG. 18.

FIGS. 18-20 show an alternative embodiment module 28 with an engaging projection 44 attached to the inside edge of the module 28. The engaging projection 44 engages the compliant capping 40 as discussed above with regard to FIGS. 16-17. In the embodiment shown, the engaging projection is elongated with ramps 45 on both ends. These ramps 45 which could also be radiused, permit the belt 12 to more freely slide vertically up or down the compliant capping 40. The size and shape of the engaging projection 44 can be altered to provide more or less engagement with the compliant capping 40, as desired. The engaging projection can be integrally molded with the module 28 or can be separate component which is then attached to the module 28 as discussed above with reference to friction insert 36.

Figure 21:
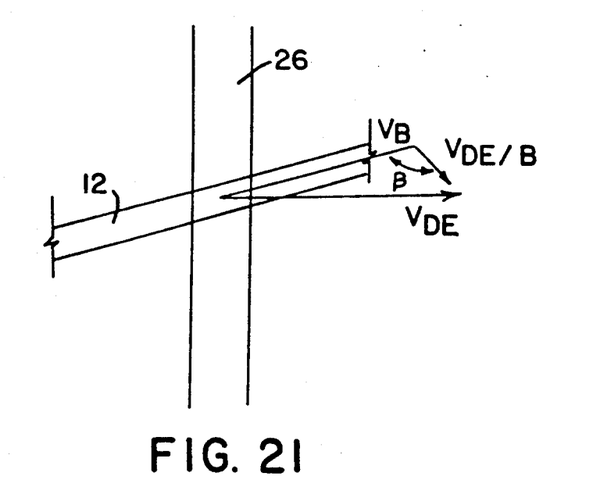
FIG. 21 is a schematic view of the belt and drive element showing the drive forces.
Figure 22:
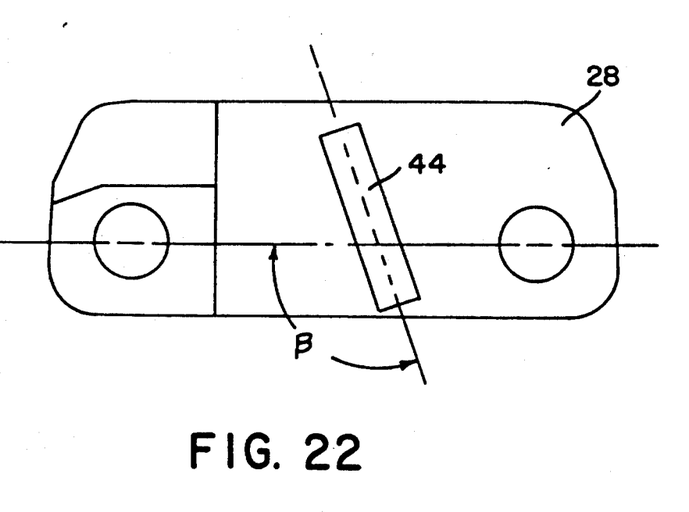
FIG. 22 is an end view of an alternative embodiment plastic module having an angled engaging projection.

FIG. 21 is a schematic view of the belt 12 and drive element 26 showing the drive forces, where $V_B$ is the velocity vector of the belt 12, $V_{DE/B}$ is the relative velocity vector of the drive element 26 to the belt 12 and $\beta$ is the angle between $V_B$ and $V_{DE/B}$. Since the belt edge is moving upwards or downwards as well as along a radial path, and since the drive elements 26 are in sliding engagement with the inside belt edge, the relative motion of the belt 12 to the drive element 26 is at the angle $\beta$. Thus, the engaging effect of the engaging projection 44 with the compliant capping 40 can be maximized if the engaging projection 44 is set at the same angle of $\beta$ in relation to $V_B$, as shown in FIG. 22.

While the invention has been described in accordance with what is presently conceived to the most practical and preferred embodiments, it is to be understood that the invention is not limited to the disclosed embodiments but on the contrary, it intended to cover various modifications and equivalent arrangements included within the spirit and the scope of the appended claims, which scope is to be accorded the broadest interpretation of such claims so as to encompass all such equivalent structures.

I claim:

1. A conveyor system comprising:
   an endless belt having a plurality of links connected together and adapted to permit passage of the belt around lateral curves;
   means to support said belt for passage through an endless path including a spiral portion extending through a plurality of vertically spaced loops with the belt curved laterally in each of the loops, an approach portion leading into a first loop at one end of the spiral portion and an exit portion leading away from a last loop at the other end of the spiral portion;
   driving means having drive surfaces engaging the belt in a frictional driving relationship along a radially inner edge of the belt in each of the loops; and
   means for increasing the frictional force between the driving means and the belt, wherein the means for increasing the frictional force comprises at least one smooth friction increasing element attached to at least one of the driving means or the belt which is compliant such that an engaging projection on the other of the driving means and the belt temporarily deforms the friction increasing element to embed itself in the compliant friction increasing element upon contact with the friction increasing element.

2. The conveyor system of claim 1 wherein the friction increasing element is attached to the belt.

3. The conveyor system of claim 1, wherein the friction increasing element is attached to the driving means.

4. The conveyor system of claim 1, wherein the friction increasing element is attached by molding the friction increasing element in place.

5. The conveyor system of claim 1, wherein the friction increasing element is attached by snap-fitting.

6. The conveyor system of claim 1, wherein the friction increasing element is attached by an adhesive.

7. The conveyor system of claim 1, wherein the engaging projection is an elongated ridge.

8. The conveyor system of claim 7, wherein the engaging projection comprises at least one ramp on at least one longitudinal end of the elongated ridge.

9. The conveyor system of claim 7, wherein the elongated ridge is attached at an angle with respect to a direction of belt travel.

10. The conveyor system of claim 9, wherein the elongated ridge is attached at an angle with respect to a direction of belt travel to maximize the frictional engagement due to horizontal and vertical frictional driving forces.

11. The conveyor system of claim 1, wherein the driving means comprises:
    a cylindrical cage rotatable about a vertical axis extending through the spiral portion of the belt and having surfaces that engage the belt.

12. The conveyor system of claim 11, wherein the driving surfaces comprise vertically-oriented driving bars.

13. The conveyor system of claim 1, wherein the means for increasing the frictional force increases the coefficient of friction between the driving means and the belt to 1.3 to 2.3 times the coefficient of friction between the belt and the belt support means.

14. The conveyor system of claim 1, wherein the means for increasing the frictional force increases the coefficient of friction between the driving means and the belt to 1.3 to 2.3 times the coefficient of friction between the belt and the belt support means.

15. The conveyor system of claim 1, wherein the means for increasing the frictional force increases the coefficient of friction between the driving means and the belt to 1.3 to 2.3 times the coefficient of friction between the belt and the belt support means.

16. The conveyor system of claim 1, wherein the friction increasing element comprises at least one first friction increasing element and at least one second friction increasing element whereby the second friction increasing element has a higher coefficient of friction then the first friction increasing element.

17. The conveyor system of claim 16, wherein the first friction increasing element has a higher wear resistance than the second friction increasing element.

18. The conveyor system of claim 16, wherein the first and second friction increasing elements alternate in a direction of travel of the belt.

19. The conveyor system of claim 16, wherein the second friction increasing element is embedded in the first friction increasing element.

20. The conveyor system of claim 16, wherein the first and second friction increasing elements are attached to adjacent links of the belt, respectively.

21. The conveyor system of claim 16, wherein the first and second friction increasing elements are attached to adjacent drive bars of the driving means, respectively.

22. The conveyor system of claim 16, wherein the first and second friction increasing elements are positionally spaced from each other such that adjacent contacting surfaces of the belt links simultaneously contact each of the first and second friction increasing elements.

23. The conveyor system of claim 1, wherein a contact surface of the friction increasing element is radiused.

24. The conveyor system of claim 23, wherein the contact surface is convexly radiused.

25. The conveyor system of claim 23, wherein the contact surface is concavely radiused.;

26. The conveyor system of claim 1, wherein the contact surface of the friction increasing element has a truncated radius cross-section.

27. A spiral conveyor drive element capping for attachment to a spiral conveyor drive element wherein at least a portion of the drive element capping comprises:
   a first material; and
   a second material, wherein the first material has a different coefficient of friction than the second material such that a coefficient of friction between a belt and the drive element capping is 1.3 to 2.3 times greater than a coefficient of friction between the belt and a belt support.

28. A spiral conveyor drive element capping as in claim 27, comprising a radiused contact surface.

29. A spiral conveyor drive element capping for attachment to a spiral conveyor drive element, wherein at least a portion of the drive element capping is made from a smooth compliant material such that projections from a belt can temporarily deform the capping to embed themselves into the capping upon contact with the capping, thereby increasing a coefficient of friction between the belt and the drive element capping.

30. A spiral conveyor drive element capping as in claim 29, comprising a radiused contact surface.

31. A conveyor system comprising:
   an endless belt having a plurality of links connected together and adapted to permit passage of the belt around lateral curves;
   means to support said belt for passage through an endless path including a spiral portion extending through a plurality of vertically spaced loops with the belt curved laterally in each of the loops, an approach portion leading into a first loop at one end of the spiral portion and an exit portion leading away from a last loop at the other end of the spiral portion;
   driving means having drive surfaces engaging the belt in a frictional driving relationship along a radially inner edge of the belt in each of the loops; and
   means for increasing the frictional force between the driving means and the belt, wherein the means for increasing the frictional force comprises at least one smooth friction increasing element attached to at least one of the driving means or the belt, the friction increasing element comprising at least one first friction increasing element and at least one second friction increasing element whereby the second friction increasing element has a higher coefficient of friction then the first friction increasing element.

32. The conveyor system of claim 31, wherein the friction increasing element is attached to the belt.

33. The conveyor system of claim 31, wherein the friction increasing element is attached to the driving means.

34. The conveyor system of claim 31, wherein the friction increasing element is attached to the driving means and is compliant such that an engaging projection on one of the driving means and the belt is embedded in the compliant friction increasing element.

35. The conveyor system of claim 34, wherein the engaging projection is an elongated ridge.

36. The conveyor system of claim 35, wherein the elongated ridge is attached at an angle with respect to a direction of belt travel.

37. The conveyor system of claim 36, wherein the elongated ridge is attached at an angle with respect to a direction of belt travel to maximize the frictional engagement due to horizontal and vertical frictional driving forces.

38. The conveyor system of claim 31, wherein the driving means comprises:
   a cylindrical cage rotatable about a vertical axis extending through the spiral portion of the belt and having surfaces that engage the belt.

39. The conveyor system of claim 38, wherein the driving surfaces comprise vertically oriented driving bars.

40. The conveyor system of claim 31, wherein the means for increasing the frictional force increases the coefficient of friction between the driving means and the belt to 1.3 to 2.3 times the coefficient of friction between the belt and the belt support means.

41. The conveyor system of claim 31, wherein the first friction increasing element has a higher wear resistance than the second friction increasing element.

42. The conveyor system of claim 31, wherein the first and second friction increasing elements alternate in a direction of travel of the belt.

43. The conveyor system of claim 31, wherein the second friction increasing element is embedded in the first friction increasing element.

44. The conveyor system of claim 31, wherein the first and second friction increasing elements are attached to adjacent links of the belt, respectively.

45. The conveyor system of claim 31, wherein the first and second friction increasing elements are attached to adjacent drive bars of the driving means, respectively.

46. The conveyor system of claim 31, wherein the first and second friction increasing elements are positonally spaced from each other such that adjacent contacting surfaces of the belt links simultaneously contact each of the first and second friction increasing elements.

47. The conveyor system of claim 31, wherein a contact surface of the friction increasing element is radiused.

48. The conveyor system of claim 47, wherein the contact surface is convexly radiused.

49. The conveyor system of claim 47, wherein the contact surface is concavely radiused.

50. The conveyor system of claim 31, wherein a contact surface of the friction increasing element has a truncated radius cross-section.

* * * * *